US011866961B2

(12) United States Patent
Lee

(10) Patent No.: US 11,866,961 B2
(45) Date of Patent: Jan. 9, 2024

(54) ANTI-VANDAL PADLOCK

(71) Applicant: ABA Locks International Co., Ltd., New Taipei (TW)

(72) Inventor: Miko Lee, New Taipei (TW)

(73) Assignee: ABA LOCKS INTERNATIONAL CO., LTD., New Taipei (TW)

( * ) Notice: Subject to any disclaimer, the term of this patent is extended or adjusted under 35 U.S.C. 154(b) by 330 days.

(21) Appl. No.: 17/497,256

(22) Filed: Oct. 8, 2021

(65) Prior Publication Data

US 2023/0110118 A1 Apr. 13, 2023

(51) Int. Cl.
*E05B 67/24* (2006.01)
*E05B 27/08* (2006.01)
*E05B 67/38* (2006.01)
*E05B 67/10* (2006.01)

(52) U.S. Cl.
CPC ............ *E05B 67/24* (2013.01); *E05B 27/083* (2013.01); *E05B 67/10* (2013.01); *E05B 67/38* (2013.01)

(58) Field of Classification Search
CPC ...... E05B 27/08; E05B 27/083; E05B 27/086; E05B 67/06; E05B 67/10; E05B 67/22; E05B 67/24; E05B 67/38
See application file for complete search history.

(56) References Cited

U.S. PATENT DOCUMENTS 6,718,808 B2 * 4/2004 Yu ......................... E05B 27/083 70/419
7,140,209 B2 * 11/2006 Lai .......................... E05B 67/10 70/284
7,155,944 B1 * 1/2007 Lin ....................... E05B 37/025 70/284
7,210,318 B2 * 5/2007 Yu ......................... E05B 37/025 70/284
8,171,760 B2 * 5/2012 Yen ......................... E05B 39/00 70/284
8,720,236 B2 * 5/2014 Ling .................. E05B 37/0034 70/284
9,803,398 B2 * 10/2017 Lai .......................... E05B 67/24
(Continued)

FOREIGN PATENT DOCUMENTS

TW 182882 4/1992
TW 253443 8/1995
(Continued)

*Primary Examiner* — Christopher J Boswell
(74) *Attorney, Agent, or Firm* — Brad J. Thorson; DeWitt LLP

(57) ABSTRACT

An anti-vandal padlock has a base, a buckling unit, two anti-sawing sleeves, a ball, and a locking mechanism. The base has a mounting passage and an annular groove formed on an inner surface of the mounting passage. The buckling unit has two straight segments. The second anti-sawing sleeve is rotatably and axially-movably mounted in the mounting passage, and has a ball hole. The ball is mounted in the second anti-sawing sleeve and is capable of protruding out of the ball hole. In the locked state, the locking mechanism makes the ball engage in the annular groove to limit movement of the second anti-sawing sleeve, such that the buckling unit cannot be detached from the second anti-sawing sleeve. The two anti-sawing sleeves are rotatably mounted on the two straight segments such that the buckling unit cannot be sawn off and has a better anti-theft ability.

12 Claims, 14 Drawing Sheets

(56) References Cited

U.S. PATENT DOCUMENTS

| | | | | |
|---|---|---|---|---|
| 2005/0262902 A1* | 12/2005 | Ling | ..................... | E05B 37/025<br>70/432 |
| 2009/0031764 A1* | 2/2009 | Huang | .................... | E05B 39/00<br>70/21 |
| 2022/0356736 A1* | 11/2022 | Mollick | .................. | E05B 67/24 |

FOREIGN PATENT DOCUMENTS

| | | |
|---|---|---|
| TW | I268300 | 12/2006 |
| TW | I269825 | 1/2007 |

* cited by examiner

ANTI-VANDAL PADLOCK

BACKGROUND OF THE INVENTION

1. Field of the Invention

The present invention relates to a lock, especially to a padlock that cannot be sawn off.

2. Description of the Prior Arts

A conventional padlock has a lock base and a U-shaped buckling unit. The U-shaped buckling unit is elongated and is used to hook and surround objects that need locking. The lock base can be set on both ends of the U-shaped buckling unit and locked to make the objects unable to be detached from the U-shaped buckling unit.

However, in the conventional padlock, the U-shaped buckling unit has two straight segments, facilitating a saw to be abutted thereon, and therefore the U-shaped buckling unit is easy to be sawn off Besides, the U-shaped structure is also easily broken by applying an exterior force between the two straight segments by two wrenches propping up each other. To sum up, the conventional padlock has a weak anti-theft effect.

To overcome the shortcomings, the present invention provides an anti-vandal padlock to mitigate or obviate the aforementioned problems.

SUMMARY OF THE INVENTION

The main objective of the present invention is to provide an anti-vandal padlock that cannot be sawn off and therefore has a strong anti-theft effect.

The anti-vandal padlock has a base, a buckling unit, a first anti-sawing sleeve, a second anti-sawing sleeve, at least one ball, and a locking mechanism. The base has a mounting passage having an annular groove formed on an inner surface of the mounting passage. The buckling unit is an elongated rod and has a pivoting segment, a first straight segment, an enclosing segment, and a second straight segment. The pivoting segment is rotatably mounted in the base. The first straight segment is connected to the pivoting segment and is located outside the base. The enclosing segment is connected to the first straight segment. The second straight segment is connected to the enclosing segment. The first anti-sawing sleeve is rotatably sleeved on the first straight segment. The second anti-sawing sleeve is rotatably and axially moveably mounted in the mounting passage. The second anti-sawing sleeve has at least one ball hole and at least one guiding wall. The at least one ball hole is formed through a wall of the second anti-sawing sleeve. The at least one guiding wall is respectively formed on a periphery of the at least one ball hole. The at least one ball is movably mounted in the second anti-sawing sleeve and is capable of respectively protruding out of the at least one ball hole. The at least one ball is restricted by the at least one guiding wall such that the at least one ball cannot move along an axial direction of the second anti-sawing sleeve. The locking mechanism is connected to the second anti-sawing sleeve and has an abutting wall and a retreating groove. The anti-vandal padlock has a locked state and an unlocked state.

When the anti-vandal padlock is in the locked state, the second straight segment is aligned to the mounting passage of the base, the second anti-sawing sleeve is rotatably sleeved on the second straight segment, the at least one ball hole of the second anti-sawing sleeve is aligned to the annular groove of the base, the locking mechanism abuts the at least one ball by the abutting wall and makes the at least one ball keep protruding out of the at least one ball hole and located in the annular groove, the at least one ball is capable of moving in the annular groove along with the rotation of the second anti-sawing sleeve, and the second anti-sawing sleeve is restricted by the at least one ball and the annular groove and cannot move along the axial direction of the second anti-sawing sleeve, such that the second straight segment cannot be detached from the second anti-sawing sleeve.

When the anti-vandal padlock is in the unlocked state, the retreating groove of the locking mechanism is aligned to the at least one ball, the at least one ball is located in the retreating groove and does not protrude out of the at least one ball hole, and the second anti-sawing sleeve is axially moveable and is not sleeved on the second straight segment such that the buckling unit is capable of pivoting with respect to the base.

When the anti-vandal padlock is in the locked state, since the first anti-sawing sleeve is rotatably sleeved on the first straight segment of the buckling unit and the second anti-sawing sleeve is rotatably sleeved on the second straight segment of the buckling unit, a saw can only abut the first anti-sawing sleeve and the second anti-sawing sleeve but cannot directly abut the first straight segment or the second straight segment of the buckling unit. Further, since the first anti-sawing sleeve and the second anti-sawing sleeve are rotatable, the first anti-sawing sleeve and the second anti-sawing sleeve will rotate along with the movement of the saw such that the saw cannot saw off the first anti-sawing sleeve and the second anti-sawing sleeve, and therefore the anti-vandal padlock has a strong anti-theft effect.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
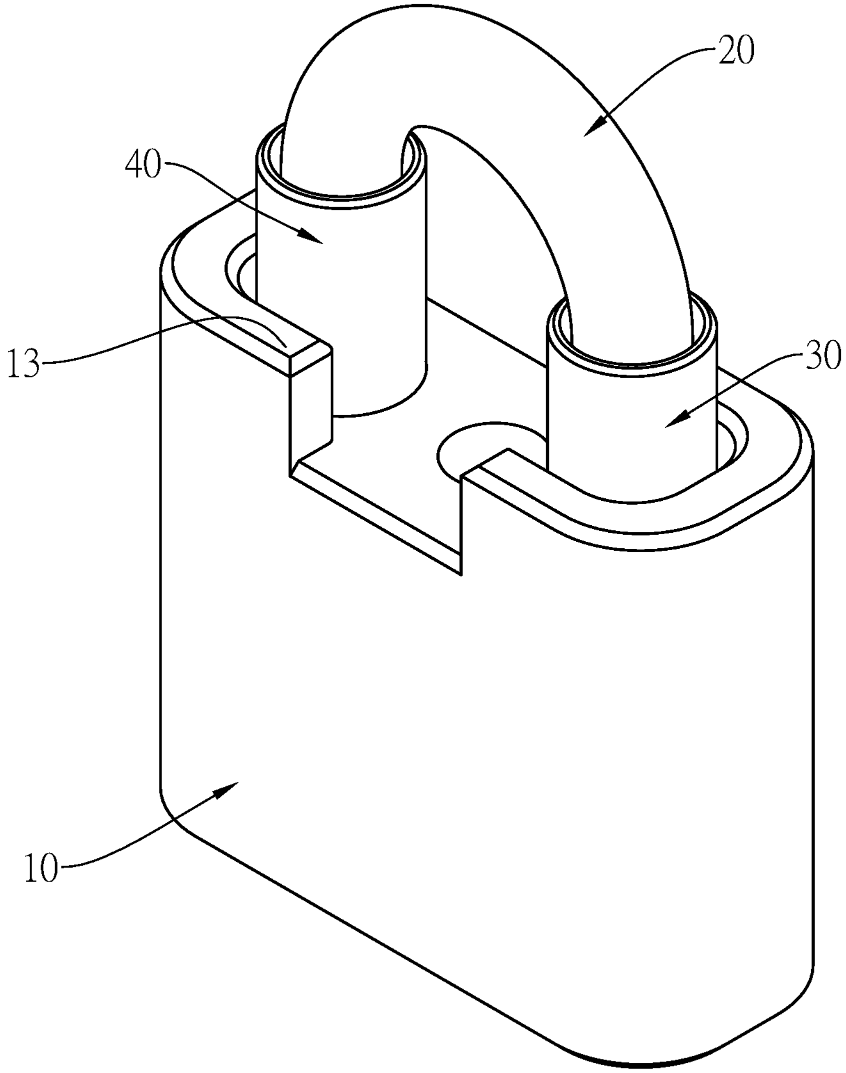
FIG. 1 is a perspective view of an anti-vandal padlock in accordance with the present invention, showing the locked state.
Figure 2:
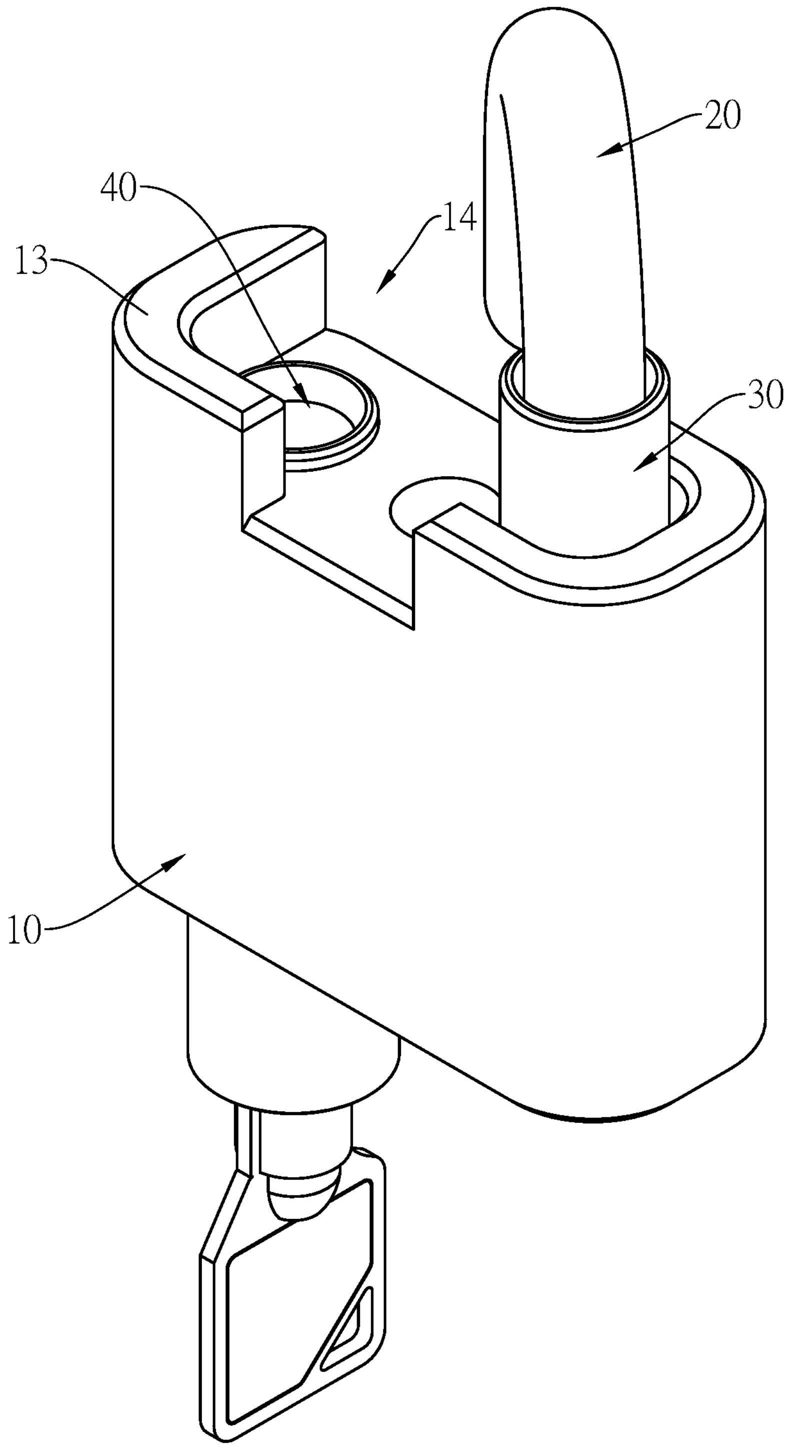
FIG. 2 is another perspective view of the anti-vandal padlock in FIG. 1, showing the unlocked state.
Figure 3:
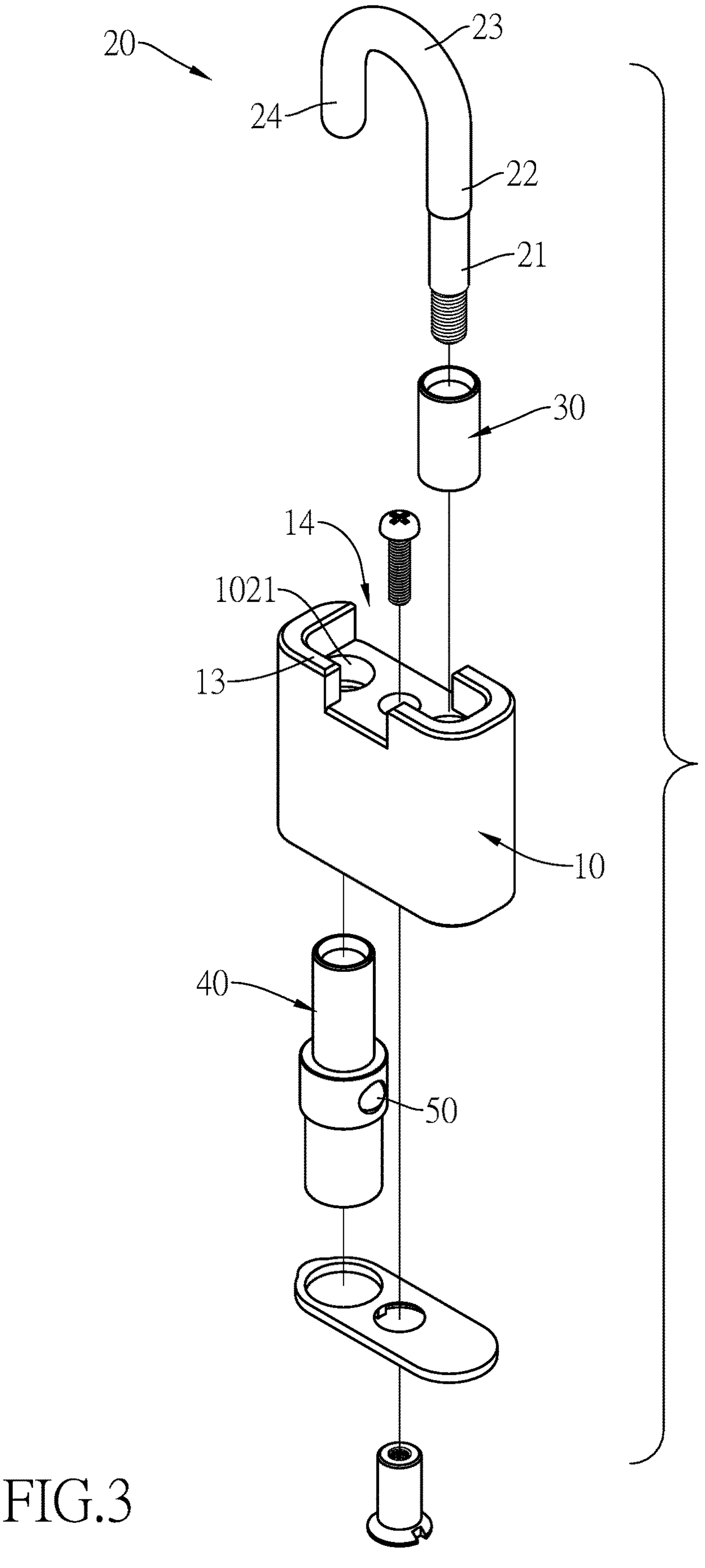
FIG. 3 is an exploded view of the anti-vandal padlock in FIG. 1.
Figure 5:
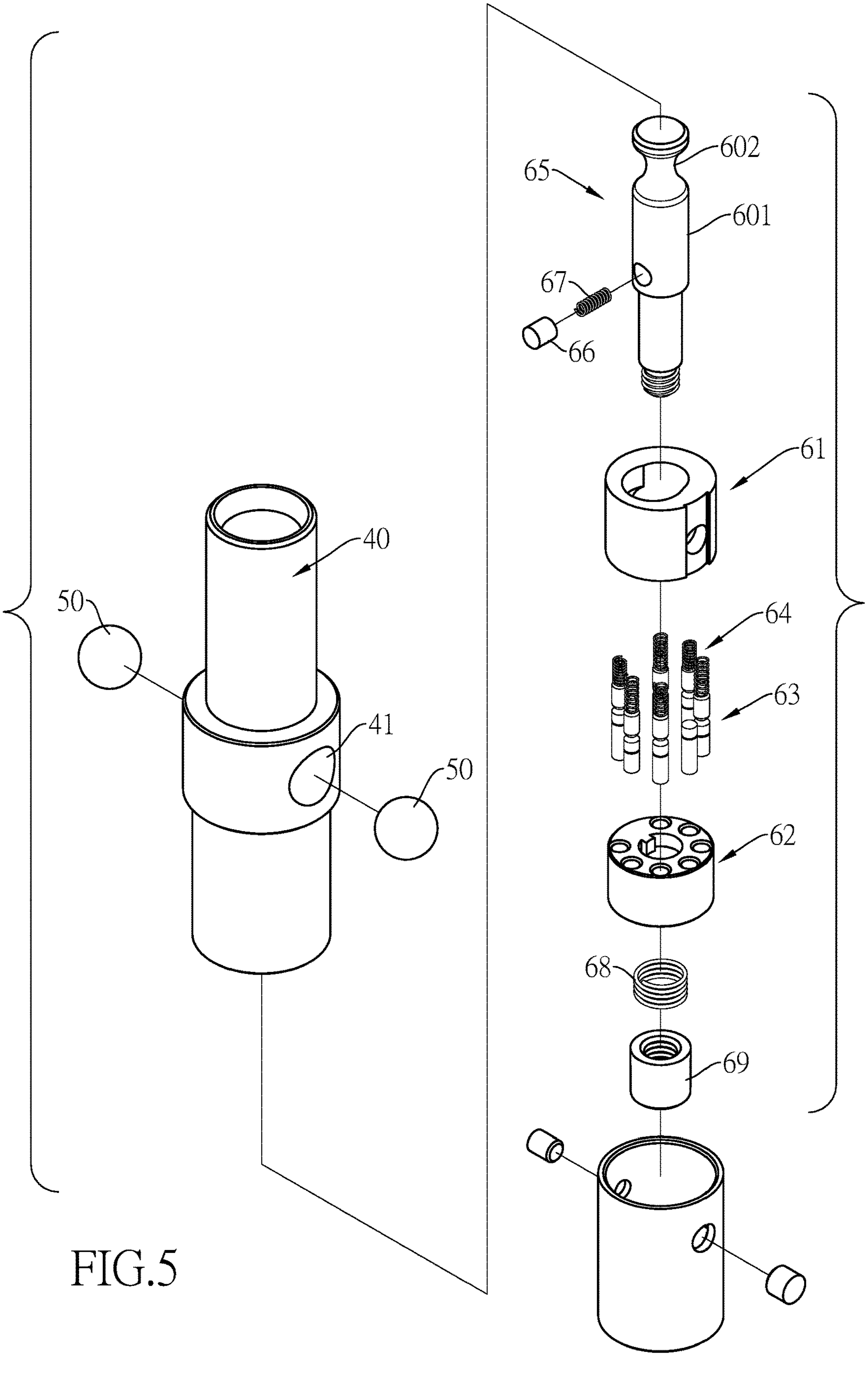
FIG. 5 is another exploded view of the anti-vandal padlock in FIG. 1, showing the second anti-sawing sleeve and the locking mechanism.
Figure 11:
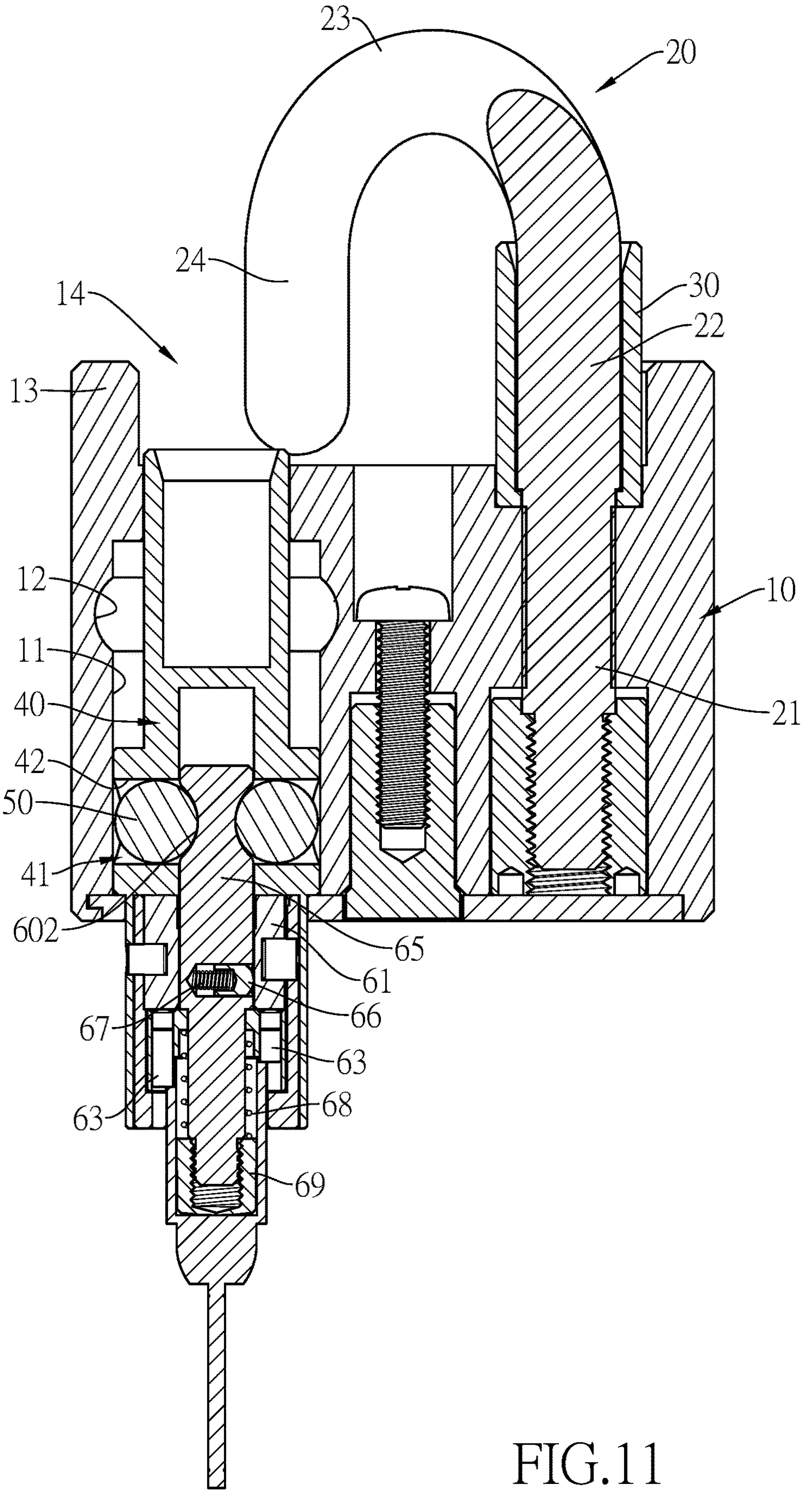
FIG. 11 is another front view in cross-section of the anti-vandal padlock in FIG. 1, showing the unlocked state.
Figure 12:
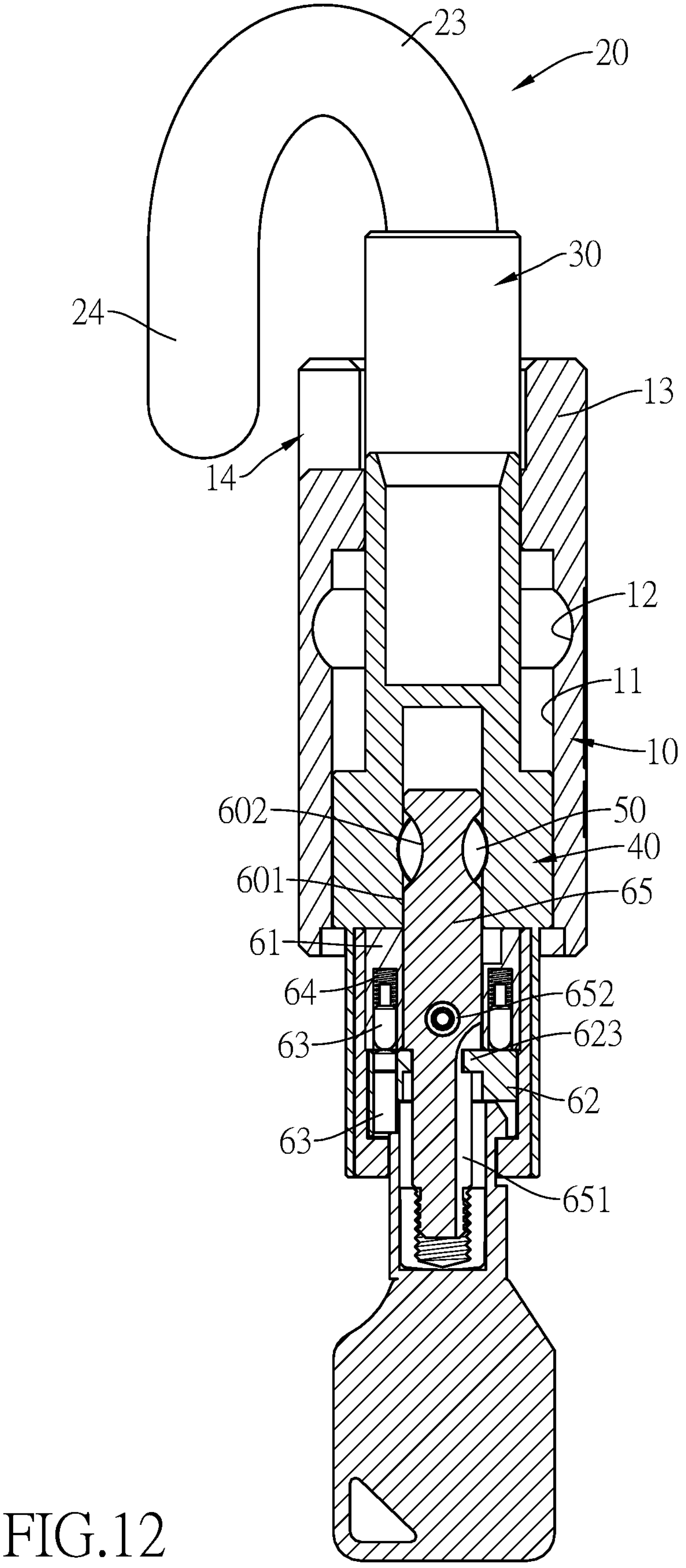
FIG. 12 is another side view in cross-section of the anti-vandal padlock in FIG. 1, showing the unlocked state.

With reference to FIGS. 1, 3, and 5, an anti-vandal padlock in accordance with the present invention comprises a base 10, a buckling unit 20, a first anti-sawing sleeve 30, a second anti-sawing sleeve 40, at least one ball 50, and a locking mechanism 60. The anti-vandal padlock has a locked state and an unlocked state. The locked state is shown in FIGS. 1, 8, 9, and 10. The unlocked state is shown in FIGS. 2, 11, and 12.

Figure 4:
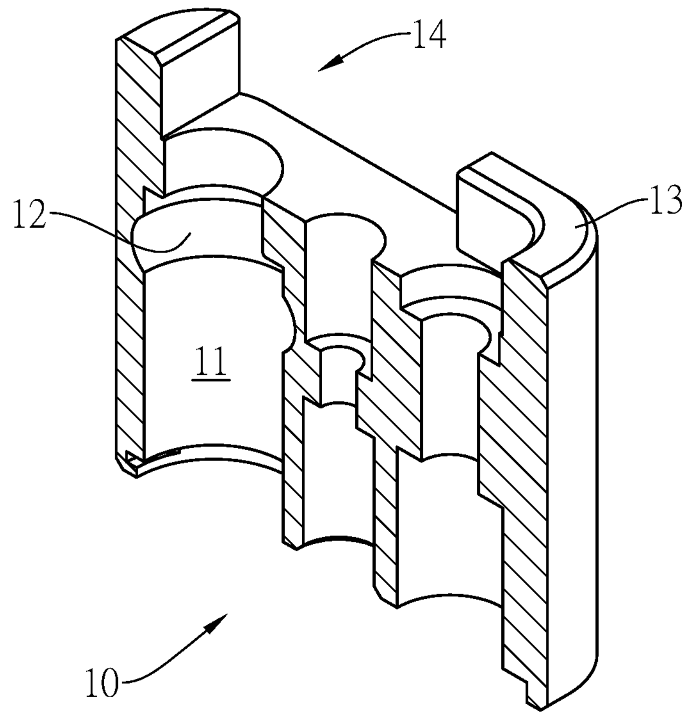
FIG. 4 is a perspective view in cross-section of the anti-vandal padlock in FIG. 1, showing the base.

With reference to FIG. 4, the base 10 has a mounting passage 11. An annular groove 12 is formed on an inner surface of the mounting passage 11.

With reference to FIG. 3, the buckling unit 20 is elongated, and specifically the buckling unit 20 is U-shaped in this embodiment. The buckling unit 20 has a pivoting segment 21, a first straight segment 22, an enclosing segment 23, and a second straight segment 24. The pivoting segment 21 extends straightly and is rotatably mounted in the base 10. The first straight segment 22 is connected to the pivoting segment 21 and is located outside the base 10. The enclosing segment 23 is connected to the first straight segment 22 and extends in a curved manner. The second straight segment 24 is connected to the enclosing segment 23. The enclosing segment 23 and the second straight segment 24 move with respect to the base 10 along with the rotation of the pivoting segment 21 with respect to the base 10.

Figure 8:
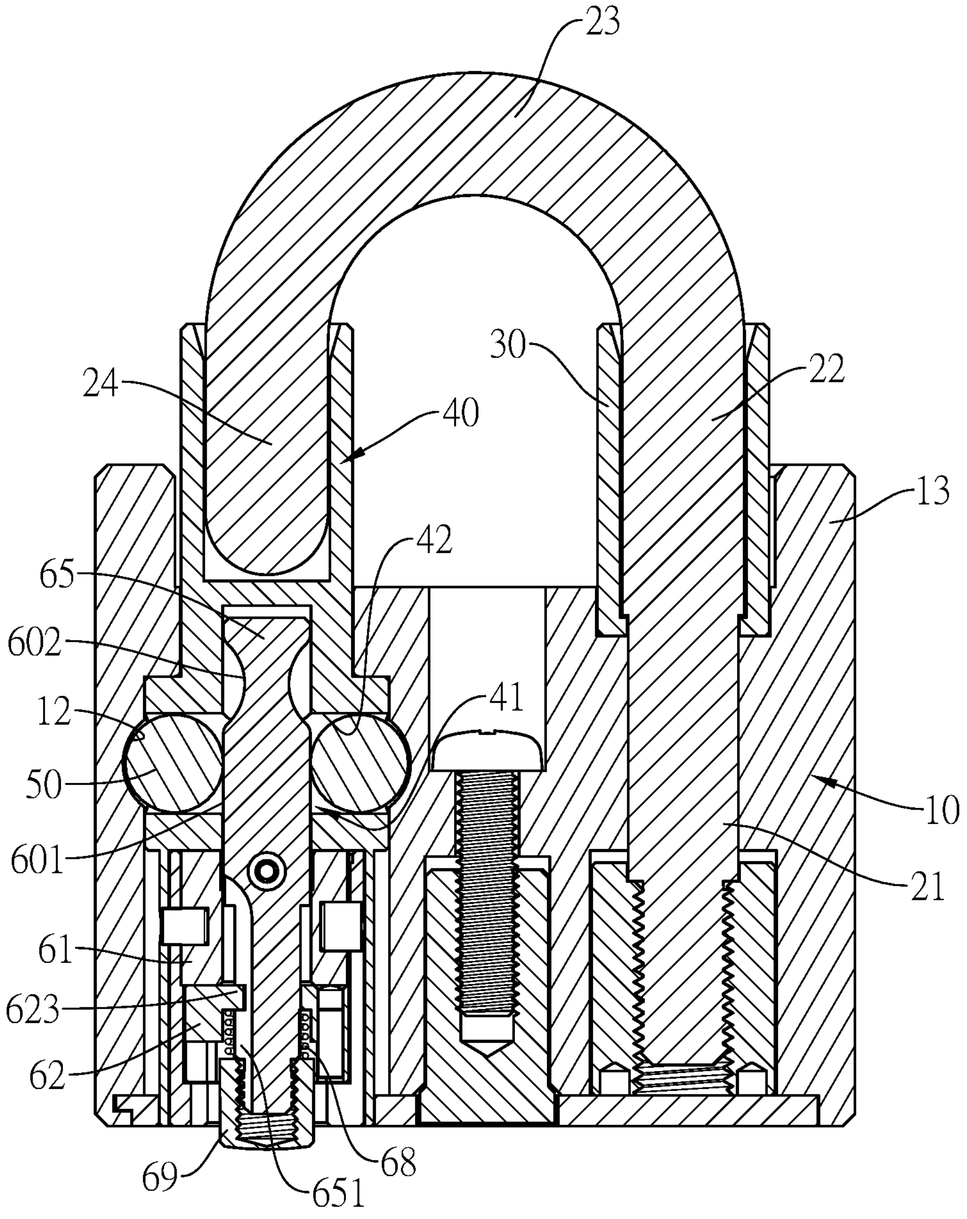
FIG. 8 is a front view in cross-section of the anti-vandal padlock in FIG. 1, showing the locked state.
Figure 13:
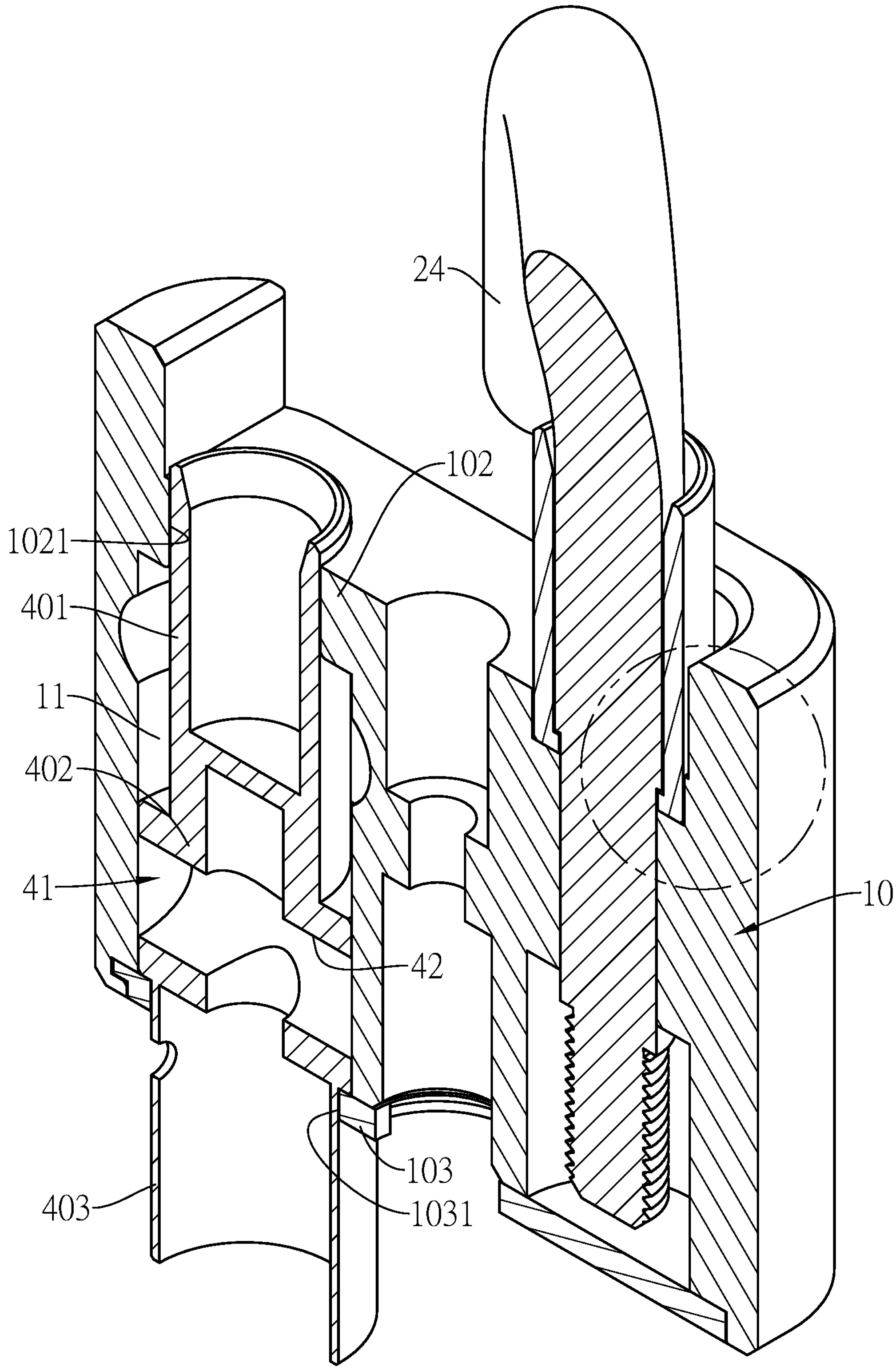
FIG. 13 is still another perspective view in cross-section of the anti-vandal padlock in FIG. 1, showing the base, the buckling unit, the first anti-sawing sleeve, and the second anti-sawing sleeve.
Figure 14:
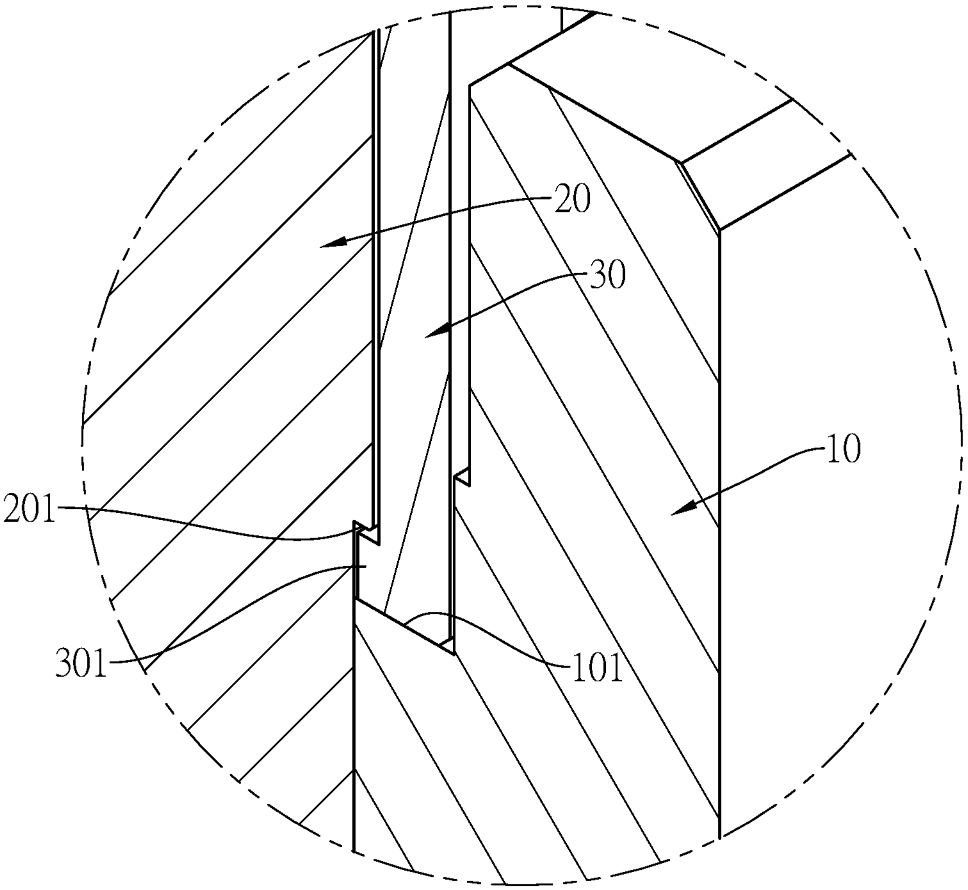
FIG. 14 is a partial enlarged view in cross-section of the anti-vandal padlock in FIG. 13, showing the base, the buckling unit, and the first anti-sawing sleeve.

With reference to FIGS. 8, 13, and 14, the first anti-sawing sleeve 30 is rotatably sleeved on the first straight segment 22. Specifically, in this embodiment, the first anti-sawing sleeve 30 has a limiting annular flange 301 formed inward on a periphery of a bottom opening of the first anti-sawing sleeve 30. The buckling unit 20 has a buckling unit step surface 201 formed between the pivoting segment 21 and the first straight segment 22 of the buckling unit 20. The base 10 has a base step surface 101. The limiting annular flange 301 abuts between the buckling unit step surface 201 and the base step surface 101 to form a buckling structure to axially fix the first anti-sawing sleeve 30 and the buckling unit 20. In this embodiment, the buckling structure is formed between the base 10, the first anti-sawing sleeve 30, and the buckling unit 20. However, in other embodiments, the buckling structure can be formed only between the first anti-sawing sleeve 30 and the buckling unit 20, or only between the first anti-sawing sleeve 30 and the base 10.

With reference to FIGS. 5, 8, and 11, the second anti-sawing sleeve 40 is rotatably and axially moveably mounted in the mounting passage 11. The second anti-sawing sleeve 40 has at least one ball hole 41 and at least one guiding wall 42. The at least one ball hole 41 is formed through a wall of the second anti-sawing sleeve 40. The at least one guiding wall 42 is formed on a periphery of the at least one ball hole 41. The guiding wall 42 is configured to guide the ball 50 to protrude out of or retract into the ball hole 41.

Further, with reference to FIG. 13, in this embodiment, the base 10 has a top wall 102 and a bottom wall 103. Besides, the second anti-sawing sleeve 40 has an upper sleeve segment 401, a middle sleeve segment 402, and a lower sleeve segment 403 sequentially connected to each other. The top wall 102 has a top through hole 1021. The top through hole 1021 communicates with the mounting passage 11. Besides, an inner diameter of the top through hole 1021 is larger than an outer diameter of the upper sleeve segment 401 and smaller than an outer diameter of the middle sleeve segment 402. The bottom wall 103 has a bottom through hole 1031. The bottom through hole 1031 communicates with the mounting passage 11. Besides, an inner diameter of the bottom through hole 1031 is larger than an outer diameter of the lower sleeve segment 403 and smaller than the outer diameter of the middle sleeve segment 402. The upper sleeve segment 401 is capable of protruding out of the top through hole 1021. The lower sleeve segment 403 is capable of protruding out of the bottom through hole 1031. The middle sleeve segment 402 protrudes out of the upper sleeve segment 401 and the lower sleeve segment 403 in a radial direction and is capable of abutting the top wall 102 or the bottom wall 103 to prevent the second anti-sawing sleeve 40 being detached from the mounting passage 11. Additionally, the upper sleeve segment 401 is selectively sleeved on the second straight segment 24 of the buckling unit 20. The ball hole 41 and the guiding wall 42 are formed on the middle sleeve segment 402. The locking mechanism 60 is mounted in the lower sleeve segment 403.

The ball 50 is movably mounted in second anti-sawing sleeve 40 and is capable of protruding out of the ball hole 41. The ball 50 is restricted by the guiding wall 42 such that the ball 50 cannot move along an axial direction of the second anti-sawing sleeve 40.

The locking mechanism 60 is connected to the second anti-sawing sleeve 40 and has an abutting wall 601 and a retreating groove 602.

With reference to FIGS. 1, 4, 8, and 9, when the anti-vandal padlock is in the locked state, the second straight segment 24 is aligned to the mounting passage 11 of the base 10. The second anti-sawing sleeve 40 is rotatably sleeved on the second straight segment 24. The ball hole 41 of the second anti-sawing sleeve 40 is aligned to the annular groove 12 of the base 12. The locking mechanism 60 abuts the ball 50 by the abutting wall 601 and makes the ball 50 keep protruding out of the ball hole 41 and located in the annular groove 12. The ball 50 is capable of moving in the annular groove 12 along with the rotation of the second anti-sawing sleeve 40. The second anti-sawing sleeve 40 is restricted by the ball 50 and the annular groove 12 and cannot move along the axial direction of the second anti-sawing sleeve 40, such that the second straight segment 24 cannot be detached from the second anti-sawing sleeve 40.

With reference to FIGS. 2, 11, and 12, when the anti-vandal padlock is in the unlocked state, the retreating groove 602 of the locking mechanism 60 is aligned to the ball 50. The ball 50 is located in the retreating groove 602 and does not protrude out of the ball hole 41. The second anti-sawing sleeve 40 is axially moveable and is not sleeved on the second straight segment 24 such that the buckling unit 20 is capable of pivoting with respect to the base 10.

With reference to FIG. 5, specifically, in this embodiment, the locking mechanism 60 has a first lock cylinder base 61, a second lock cylinder base 62, multiple lock bolts 63, multiple bolt elastic units 64, a lock shaft 65, a locking unit 66, a locking elastic unit 67, a shaft elastic unit 68, and a shaft cap 69.

Figure 6:
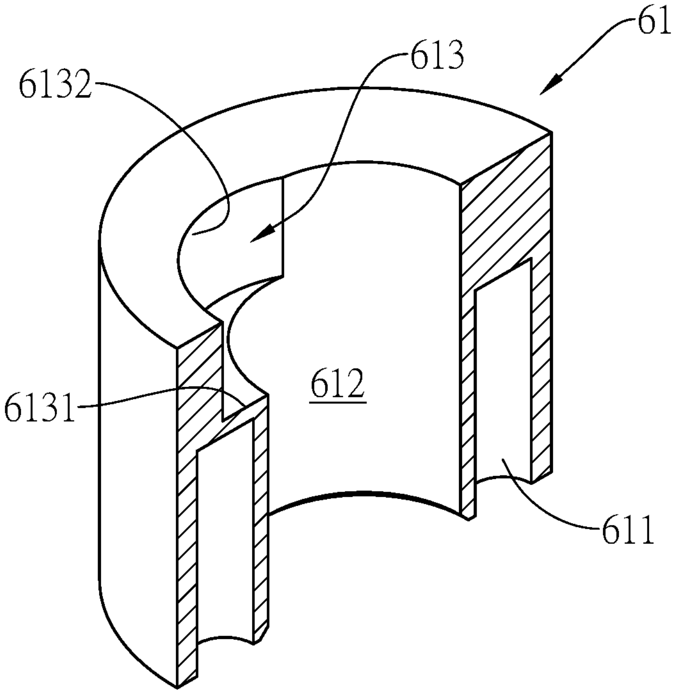
FIG. 6 is another perspective view in cross-section of the anti-vandal padlock in FIG. 1, showing the first lock cylinder base.
Figure 9:
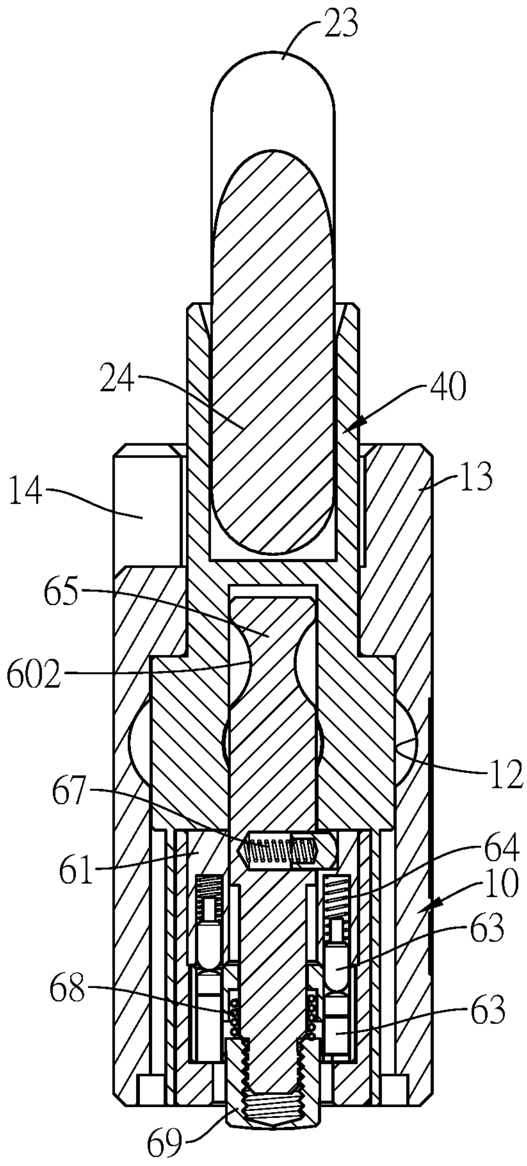
FIG. 9 is a side view in cross-section of the anti-vandal padlock in FIG. 1, showing the locked state.
Figure 10:
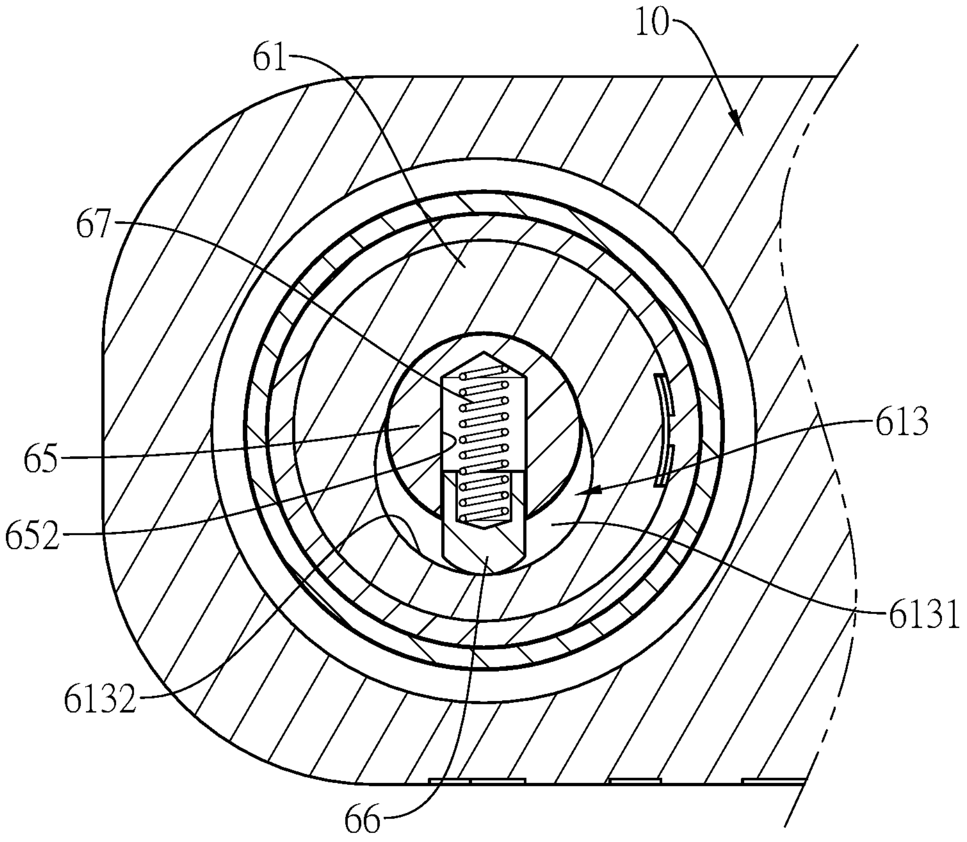
FIG. 10 is a top view in cross-section of the anti-vandal padlock in FIG. 1, showing the locked state.

With reference to FIGS. 6, 9, and 10, the first lock cylinder base 61 is securely mounted on the second anti-sawing sleeve 40 and has multiple first bolt holes 611, a first shaft hole 612, and a locking groove 613. The locking groove 613 is formed on an inner surface of the first shaft hole 612 and has a locking wall 6131 and an unlocking wall 6132. The locking wall 6131 is perpendicular to an axis of the first shaft hole 612. The unlocking wall 6132 faces to the axis of the first shaft hole 612, is curved, and is connected to the inner surface of the first shaft hole 612.

Figure 7:
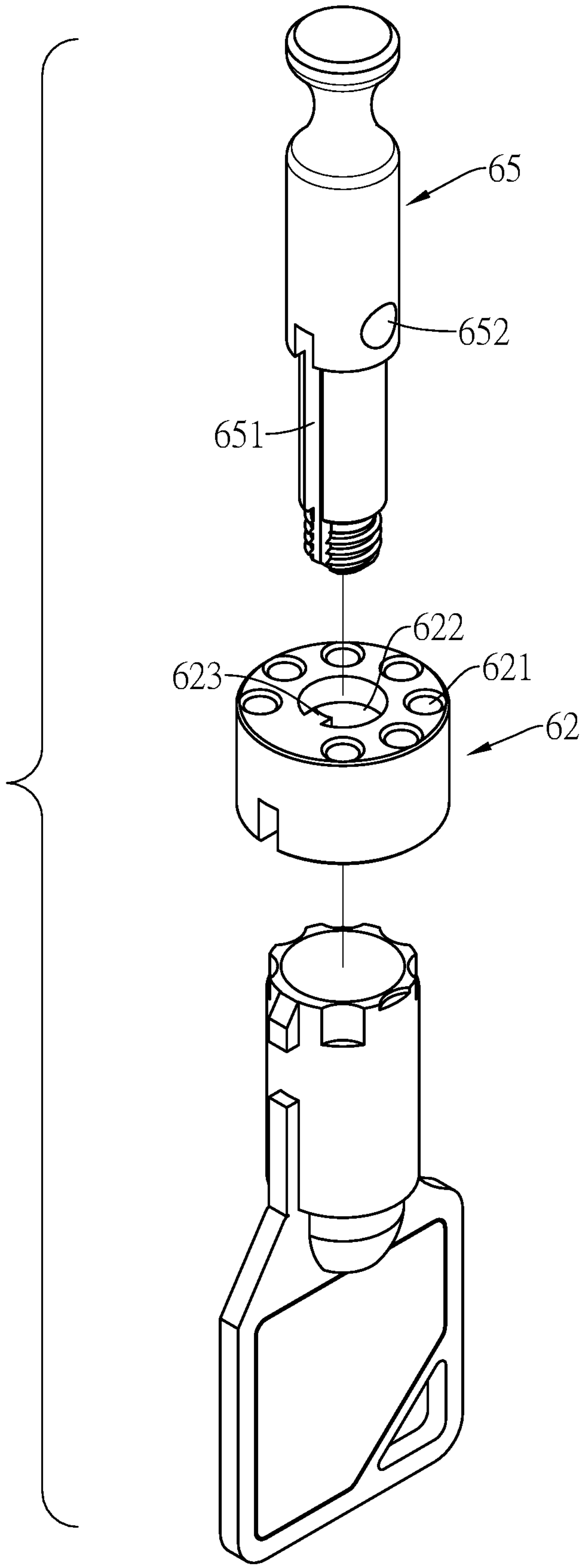
FIG. 7 is still another exploded view of the anti-vandal padlock in FIG. 1, showing the second lock cylinder base and the lock shaft.

With reference to FIGS. 7, 8, and 12, the second lock cylinder base 62 is rotatable with respect to the second anti-sawing sleeve 40 and has multiple second bolt holes 621 and a second shaft hole 622. The second bolt holes 621 are selectively aligned to the first bolt holes 611. The second shaft hole 622 has a limiting segment 623 formed on an inner surface of the second shaft hole 622.

With reference to FIGS. 5 and 9, the lock bolts 63 are respectively and movably mounted in the first bolt holes 611 and the second bolt holes 621. At least one of the lock bolts 63 is selectively mounted in one of the first bolt holes 611 and one of the second bolt holes 621 at the same time to prevent the first lock cylinder base 61 and the second lock cylinder base 62 from rotating with respect to each other. The bolt elastic units 64 are respectively mounted in the first bolt holes 611 and push the lock bolts 63 toward the second bolt holes. Specifically, in this embodiment, there are fourteen lock bolts 63, seven first bolt holes 611, and seven second bolt holes 621. The seven lock bolts 63 are respectively mounted in the seven first bolt holes 611 while the other seven lock bolts 63 are respectively mounted in the seven second bolt holes 621. The seven lock bolts 63 that are mounted in the first bolt holes 611 respectively abut the seven lock bolts 63 that are mounted in the second bolt holes 621. Any one of the lock bolts 63 is capable of moving to be mounted in the first bolt hole 611 and the second bolt hole 621 at the same time. As long as any one of the lock bolts 63 is mounted in the first bolt hole 611 and the second bolt hole 621 at the same time, the first lock cylinder base 61 and the second lock cylinder base 62 cannot rotate with respect to each other. When none of the lock bolts 63 is mounted in the first bolt hole 611 and the second bolt hole 621 at the same time, the first lock cylinder base 61 and the second lock cylinder base 62 are allowed to rotate with respect to each other.

With reference to FIGS. 6, 7, 8, and 12, the lock shaft 65 is rotatably and axially moveably mounted in the first shaft hole 612 and is axially moveably mounted in the second shaft hole 622. The lock shaft 65 has a limiting groove 651 and a mounting hole 652. The limiting groove 651 extends along the axial direction of the lock shaft 65. The limiting segment 623 of the second lock cylinder base 62 is movably mounted in the limiting groove 651 such that the second lock cylinder base 62 and the lock shaft 65 simultaneously rotate with respect to the first lock cylinder base 61, and the lock shaft 65 is capable of moving axially with respect to the second lock cylinder base 62. The aforementioned abutting wall 601 and the retreating groove 602 are formed on an outer annular surface of the lock shaft 65 and are arranged along an axial direction of the lock shaft 65.

With reference to FIGS. 5, 9, and 10, the locking unit 66 is mounted in the mounting hole 652 of the lock shaft 65. The locking elastic unit 67 is mounted in the mounting hole 652. The locking elastic unit 67 pushes the locking unit 66 and makes the locking unit 66 protrude out of the mounting hole 652 and abut the inner surface of the first lock cylinder base 61 or abut the unlocking wall 6132 of the locking groove 613. The locking unit 66 is capable of sliding with respect to the unlocking wall 6132 to be detached from the locking groove 613 along with the rotation of the lock shaft 65.

With reference to FIGS. 5, 8, and 11, the shaft elastic unit 68 is configured to make the lock shaft 65 aligned to the ball 50 with the retreating groove 602. The shaft cap 69 is mounted on an end of the lock shaft 65. The shaft elastic unit 68 abuts between the shaft cap 69 and the second lock cylinder base 62.

When the anti-vandal padlock is in the locked state, at least one of the lock bolts 63 is mounted in the first bolt hole 611 and the second bolt hole 621 at the same time to prevent the first lock cylinder base 61 and the second lock cylinder base 62 from rotating with respect to each other. The locking unit 66 is located in the locking groove 613 of the first lock cylinder base 610. The locking wall 6131 of the locking groove 613 stops the locking unit 66 such that the lock shaft 65 cannot move axially and is restricted to abut the ball 50 with the abutting wall 601.

When the anti-vandal padlock is in the unlocked state, none of the lock bolts 63 is mounted in one of the first bolt holes and one of the second bolt holes at the same time. The first lock cylinder base 61 and the second lock cylinder base 62 are rotatable with respect to each other. The locking unit 66 is located outside the locking groove 613 of the first lock cylinder base 61 and abuts the inner surface of the first lock cylinder base 61. The lock shaft 65 is axially moveable and the retreating groove 602 is aligned to the ball 50.

The following describes the unlocking process and locking operation of this embodiment.

The anti-vandal padlock is in the locked state before unlocked. When unlocking, a user first inserts the key into the key hole of the second lock cylinder base 62. The key will push the lock bolts 63 to compress the bolt elastic units 64, and make all the lock bolts 63 non-simultaneously mounted in the first bolt hole 611 and the second bolt hole 621, such that the first lock cylinder base 61 and the second lock cylinder base 62 are allowed to rotate with respect to each other. Next, the user turns the key to rotate the second lock cylinder base 62 and to simultaneously rotate the lock shaft 65 via the limiting segment 623 of the second lock cylinder base 62. During the rotation of the lock shaft 65, the locking unit 66 slides with respect to the unlocking wall 6132 of the locking groove 613 along with the rotation of the lock shaft 65, and the locking unit 66 is pushed by the curved unlocking wall 6132 to compress the locking elastic unit 67 and gradually move into the mounting hole 652. The locking unit 66 will move across the junction between the unlocking wall 6132 and the inner wall of the first shaft hole 612, switch from abutting the unlocking wall 6132 to abutting the inner surface of the first shaft hole 612, and be detached from the locking groove 613. At the moment, the locking unit 66 is no longer stopped by the locking wall 6131 of the locking groove 613, so the shaft elastic unit 68 is allowed to push the shaft cap 69 to move the lock shaft 65 axially, and the lock shaft 65 is switched from abutting the ball 50 with the abutting wall 601 to aligning to the ball 50 with the retreating groove 602. Therefore, the ball 50 is no longer restricted to protrude out of the ball hole 41 and engages in the annular groove 12 of the base 10, and is capable of moving into the retreating groove 602 to retreat into the ball hole 41, so the second anti-sawing sleeve 40 is allowed to move axially to be detached from the second straight segment 24 of the buckling unit 20 and then makes the buckling unit 20 rotatable with respect to the base 10 Finally, the anti-vandal padlock is switched from the locked state to the unlocked state.

The anti-vandal padlock is in the unlocked state before locked. When locking, the user first hooks and surrounds an object that needs locking with the buckling unit 20, and then turns the buckling unit 20 to align the second straight segment 24 to the mounting passage 11 of the base 10. Next, the user pushes the shaft cap 69 to make the locking mechanism 60 and the second anti-sawing sleeve 40 move axially and simultaneously and to sleeve the second anti-sawing sleeve 40 on the second straight segment 24 of the buckling unit 20. Then, the user keeps pushing the shaft cap 69 to make the lock shaft 65 move axially with respect to the first lock cylinder base 61 and the second lock cylinder base 62. At this moment, the ball 50 is abutted and limited by the guiding wall 42 such that the ball 50 cannot move along with the lock shaft 65 along the axial direction of the second anti-sawing sleeve 40. Thus, the retreating groove 602 moves with respect to the ball 50 and pushes the ball 50 to make the ball 50 gradually protrude out of the mounting hole 652. After the lock shaft 65 is moved to the set position, the locking unit 66 that abuts the inner surface of the first lock cylinder base 61 at the beginning will be aligned to the locking groove 613. Then, the locking elastic unit 67 makes the locking unit 66 pop out and mounted into the locking groove 613, and therefore the locking unit 66 is limited by the locking wall 6131 of the locking groove 613 such that the lock shaft 65 cannot move axially. At the same time, the retreating groove 602 is completely detached from the ball 50, and the lock shaft 65 is switched to abut the ball 50 with the abutting wall 601 to make the ball 50 engage in the annular groove 12 of the base 10. Finally, the anti-vandal padlock is switched from the unlocked state to the locked state.

Additionally, in this embodiment, an amount of the at least one ball 50 is two, and an amount of the at least one ball hole 41 is also two. The two balls 50 respectively correspond in position to the two ball holes 41. Further, the retreating groove 602 is an annular groove extending along a circumferential direction of the lock shaft 65 in a circle. By this, the second anti-sawing sleeve 40 rotates more smoothly in the locked state, so that the second anti-sawing sleeve 40 is harder to be sawn off.

Furthermore, with reference to FIG. 2, in this embodiment, the base 10 has a protecting wall segment 13. The protecting wall segment 13 surrounds the first straight segment 22 and the second straight segment 24 of the buckling unit 20. The protecting wall segment 13 has an opening 14 formed on a path of the second straight segment 24, and the second straight segment 24 is capable of moving through the opening 14. With the support and limitation of the protecting wall segment 13, the buckling unit 20 becomes harder to break by applying exterior force between the two straight segments by two wrenches propping up each other, thereby enhancing the structure and improving the anti-theft ability.

When the anti-vandal padlock is in the locked state, since the first anti-sawing sleeve 30 is rotatably sleeved on the first straight segment 22 of the buckling unit 20 and the second anti-sawing sleeve 40 is rotatably sleeved on the second straight segment 24 of the buckling unit 20, a saw can only abut the first anti-sawing sleeve 30 and the second anti-sawing sleeve 40 but cannot directly abut the first straight segment 22 or the second straight segment 24 of the buckling unit 20. Further, since the first anti-sawing sleeve 30 and the second anti-sawing sleeve 40 are rotatable, the first anti-sawing sleeve 30 and the second anti-sawing sleeve 40 will rotate along with the movement of the saw such that the saw cannot saw off the first anti-sawing sleeve 30 and the second anti-sawing sleeve 40, and therefore the anti-vandal padlock has a strong anti-theft effect. Besides, the base 10 has the protecting wall segment 13 to further support and protect the buckling unit 20, the first anti-sawing sleeve 30, and the second anti-sawing sleeve 40, so the anti-vandal padlock is difficult to break by applying exterior force between the two straight segments and has better anti-theft ability. Additionally, the anti-vandal padlock of the present invention can be locked up without a key, which is convenient in use.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An anti-vandal padlock comprising:

a base having
- a mounting passage having
  - an annular groove formed on an inner surface of the mounting passage;

a buckling unit being an elongated rod and having
- a pivoting segment rotatably mounted in the base;
- a first straight segment connected to the pivoting segment and located outside the base;
- an enclosing segment connected to the first straight segment; and
- a second straight segment connected to the enclosing segment;

a first anti-sawing sleeve rotatably sleeved on the first straight segment;

a second anti-sawing sleeve rotatably and axially moveably mounted in the mounting passage; the second anti-sawing sleeve having
- at least one ball hole formed through a wall of the second anti-sawing sleeve; and
- at least one guiding wall respectively formed on a periphery of the at least one ball hole;

at least one ball movably mounted in the second anti-sawing sleeve and being capable of respectively protruding out of the at least one ball hole; the at least one ball restricted by the at least one guiding wall such that the at least one ball is unmovable along an axial direction of the second anti-sawing sleeve; and a locking mechanism connected to the second anti-sawing sleeve and having
- an abutting wall; and
- a retreating groove;

wherein:

the anti-vandal padlock has a locked state and an unlocked state;

when the anti-vandal padlock is in the locked state, the second straight segment is aligned to the mounting passage of the base, the second anti-sawing sleeve is rotatably sleeved on the second straight segment, the at least one ball hole of the second anti-sawing sleeve is aligned to the annular groove of the base, the locking mechanism abuts the at least one ball by the abutting wall and makes the at least one ball keep protruding out of the at least one ball hole and located in the annular groove, the at least one ball is capable of moving in the annular groove along with the rotation of the second anti-sawing sleeve, and the second anti-sawing sleeve is restricted by the at least one ball and the annular groove and is unmovable along the axial direction of the second anti-sawing sleeve, such that the second straight segment is undetachable from the second anti-sawing sleeve; and when the anti-vandal padlock is in the unlocked state, the retreating groove of the locking mechanism is aligned to the at least one ball, the at least one ball is located in the retreating groove and does not protrude out of the at least one ball hole, and the second anti-sawing sleeve is axially moveable and is not sleeved on the second straight segment such that the buckling unit is capable of pivoting with respect to the base.

2. The anti-vandal padlock as claimed in claim 1, wherein the locking mechanism has a first lock cylinder base securely mounted on the second anti-sawing sleeve and having multiple first bolt holes;

a first shaft hole; and a locking groove formed on an inner surface of the first shaft hole and having a locking wall perpendicular to an axis of the first shaft hole;

an unlocking wall facing the axis of the first shaft hole, being curved, and connected to the inner surface of the first shaft hole;

a second lock cylinder base being rotatable with respect to the second anti-sawing sleeve and having multiple second bolt holes selectively aligned to the first bolt holes;

a second shaft hole having a limiting segment formed on an inner surface of the second shaft hole;

multiple lock bolts respectively and movably mounted in the first bolt holes and the second bolt holes; at least one of the lock bolts selectively mounted in one of the first bolt holes and one of the second bolt holes at the same time to prevent the first lock cylinder base and the second lock cylinder base form rotating with respect to each other;

multiple bolt elastic units respectively mounted in the first bolt holes and pushing the lock bolts toward the second bolt holes;

a lock shaft rotatably and axially movably mounted in the first shaft hole, and axially movably mounted in the second shaft hole; the abutting wall and the retreating groove formed on an outer annular surface of the lock shaft and arranged along an axial direction of the lock shaft; the lock shaft having a limiting groove extending along the axial direction of the lock shaft; the limiting segment of the second lock cylinder base movably mounted in the limiting groove such that the second lock cylinder base and the lock shaft simultaneously rotate with respect to the first lock cylinder base, and the lock shaft being capable of moving axially with respect to the second lock cylinder base; and a mounting hole;

a locking unit mounted in the mounting hole of the lock shaft; and a locking elastic unit mounted in the mounting hole; the locking elastic unit pushing the locking unit and making the locking unit protrude out of the mounting hole and abut the inner surface of the first lock cylinder base or abut the unlocking wall of the locking groove; the locking unit being capable of sliding with respect to the unlocking wall to be detached from the locking groove along with the rotation of the lock shaft;

wherein:

when the anti-vandal padlock is in the locked state, at least one of the lock bolts is mounted in one of the first bolt holes and one of the second bolt holes at the same time to prevent the first lock cylinder base and the second lock cylinder base from rotating with respect to each other, the locking unit is located in the locking groove of the first lock cylinder base, and the locking wall of the locking groove stops the locking unit such that the lock shaft is unmovable axially and is restricted to abut the at least one ball with the abutting wall; and when the anti-vandal padlock is in the unlocked state, none of the lock bolts is mounted in one of the first bolt holes and one of the second bolt holes at the same time, the first lock cylinder base and the second lock cylinder base are rotatable with respect to each other, the locking unit is located outside the locking groove of the first lock cylinder base and abuts the inner surface of the first lock cylinder base, and the lock shaft is axially movable and the retreating groove is aligned to the at least one ball.

3. The anti-vandal padlock as claimed in claim 2, wherein the locking mechanism has a shaft elastic unit configured to make the lock shaft aligned to the at least one ball with the retreating groove.

4. The anti-vandal padlock as claimed in claim 3, wherein the locking mechanism has a shaft cap mounted on an end of the lock shaft; the shaft elastic unit abutting between the shaft cap and the second lock cylinder base.

5. The anti-vandal padlock as claimed in claim 4, wherein an amount of the at least one ball is two;

an amount of the at least one ball hole is two;

the two balls respectively correspond in position to the two ball holes; and the retreating groove is an annular groove extending along a circumferential direction of the lock shaft.

6. The anti-vandal padlock as claimed in claim 5, wherein the base has a protecting wall segment surrounding the first straight segment and the second straight segment of the buckling unit and having an opening formed on a path of the second straight segment; the second straight segment being capable of moving through the opening.

7. The anti-vandal padlock as claimed in claim 6, wherein the second anti-sawing sleeve has an upper sleeve segment selectively sleeved on the second straight segment of the buckling unit;

a middle sleeve segment; the at least one ball hole and the guiding wall formed on the middle sleeve segment; and a lower sleeve segment; the locking mechanism mounted in the lower sleeve segment; the upper sleeve segment, the middle sleeve segment, and the lower sleeve segment sequentially connected to each other.

8. The anti-vandal padlock as claimed in claim 7, wherein the base has a top wall having a top through hole communicating with the mounting passage; an inner diameter of the top through hole being larger than an outer diameter of the upper sleeve segment and smaller than an outer diameter of the middle sleeve segment; and a bottom wall having a bottom through hole communicating with the mounting passage; an inner diameter of the bottom through hole being larger than an outer diameter of the lower sleeve segment and smaller than the outer diameter of the middle sleeve segment;

the upper sleeve segment is capable of protruding out of the top through hole;

the lower sleeve segment is capable of protruding out of the bottom through hole; and the middle sleeve segment radially protrudes out of the upper sleeve segment and the lower sleeve segment and is capable of abutting the top wall or the bottom wall to prevent the second anti-sawing sleeve being detached from the mounting passage.

9. The anti-vandal padlock as claimed in claim 2, wherein an amount of the at least one ball is two;

an amount of the at least one ball hole is two;

the two balls respectively correspond in position to the two ball holes; and the retreating groove is an annular groove extending along a circumferential direction of the lock shaft.

10. The anti-vandal padlock as claimed in claim 1, wherein the base has a protecting wall segment surrounding the first straight segment and the second straight segment of the buckling unit and having an opening formed on a path of the second straight segment; the second straight segment being capable of moving through the opening.

11. The anti-vandal padlock as claimed in claim 1, wherein the second anti-sawing sleeve has an upper sleeve segment selectively sleeved on the second straight segment of the buckling unit;

a middle sleeve segment; the at least one ball hole and the guiding wall formed on the middle sleeve segment; and a lower sleeve segment; the locking mechanism mounted in the lower sleeve segment; the upper sleeve segment, the middle sleeve segment, and the lower sleeve segment sequentially connected to each other.

12. The anti-vandal padlock as claimed in claim 11, wherein the base has a top wall having a top through hole communicating with the mounting passage; an inner diameter of the top through hole being larger than an outer diameter of the upper sleeve segment and smaller than an outer diameter of the middle sleeve segment; and a bottom wall having a bottom through hole communicating with the mounting passage; an inner diameter of the bottom through hole being larger than an outer diameter of the lower sleeve segment and smaller than the outer diameter of the middle sleeve segment;

the upper sleeve segment is capable of protruding out of the top through hole;

the lower sleeve segment is capable of protruding out of the bottom through hole; and the middle sleeve segment radially protrudes out of the upper sleeve segment and the lower sleeve segment and is capable of abutting the top wall or the bottom wall to prevent the second anti-sawing sleeve being detached from the mounting passage.

* * * * *